United States Patent Office 2,829,920
Patented Apr. 8, 1958

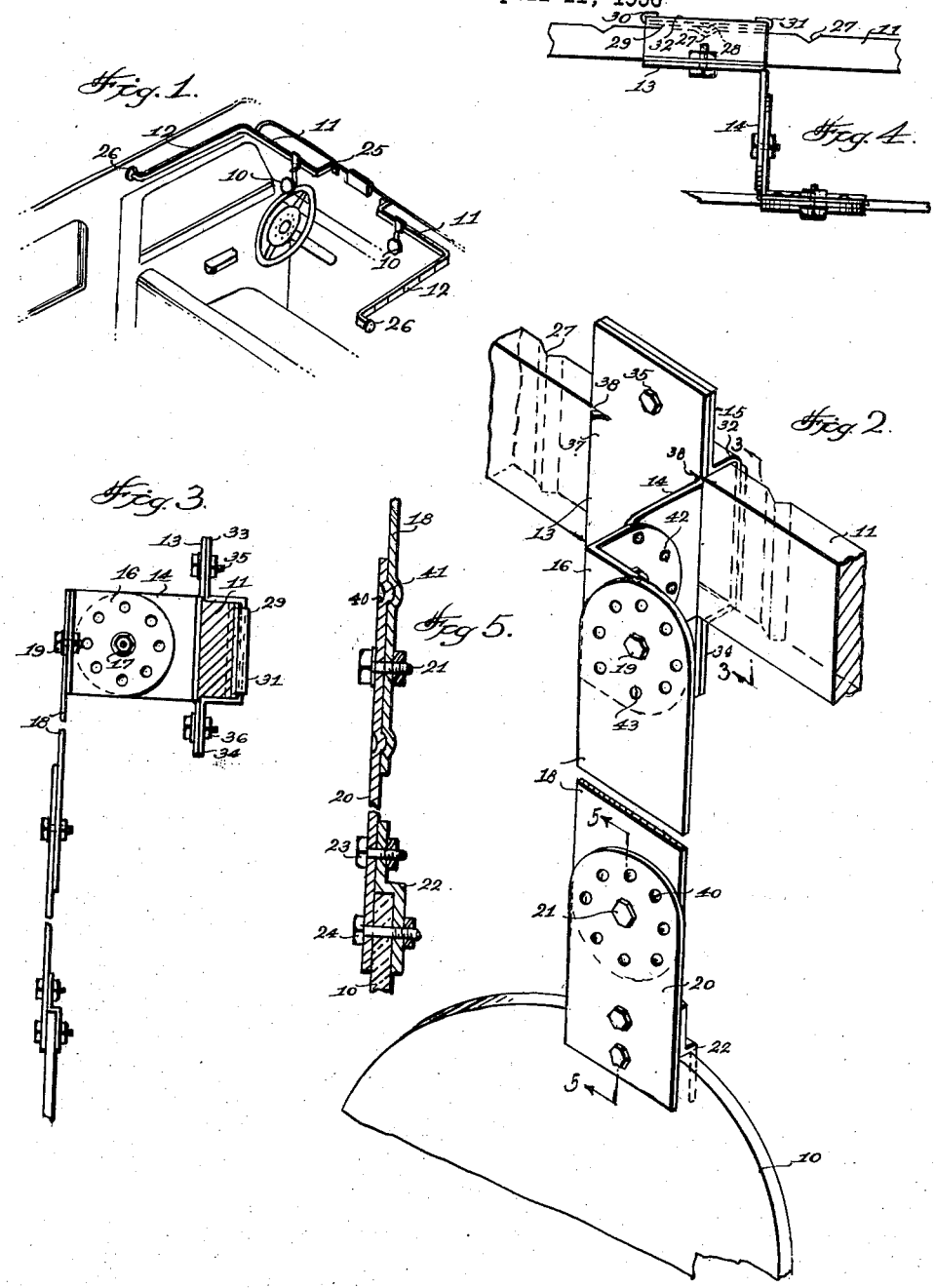

2,829,920

ANTI-GLARE SHIELD

Harry I. Cohen, Salisbury, Md.

Application April 11, 1956, Serial No. 577,543

3 Claims. (Cl. 296—97)

This invention relates to glare shields used in motor vehicles for intercepting rays of the sun and also rays of lights from both the front and rear of the vehicle, and in particular a glare shield carried by an arm having a plurality of swivel connections therein and slidably mounted on a bar extended from a point substantially in the center of the windshield and at the upper edge thereof across a side portion of the windshield and over the upper edge of a front door of the vehicle whereby with such a rod positioned on both sides of the vehicle glare shields may be adjusted to intercept light rays from substantially any point or points.

The purpose of this invention is to provide a flexible and universal mounting for a glare shield of a motor vehicle whereby the shield is adapted to be suspended to intercept glare rays from the front, rear, or side of the vehicle.

Various types of universal mountings have been provided for glare shields of motor vehicles and with such devices mounted on the windshield, cowl, or door the devices interfere with complete vision of the operator of the vehicle and in numerous instances provide a hazard instead of a help. With this thought in mind this invention contemplates a flexible mounting for an anti-glare shade whereby the shade or shield is suspended from a rod extended across the upper edge of the windshield and also over the upper edge of a front door whereby with the shield carried by an adjustable bracket on the rod or bar the shield may readily be adjusted from an out of the way position when not in use to substantially any position desired to intercept glare rays.

The object of this invention is, therefore, to provide a flexible mounting for a glare shield of a motor vehicle whereby an operator of a vehicle may, with one hand, adjust the position of the shield to intercept rays of light such as from the sun ahead of the vehicle or to one side thereof and also glare rays from headlights approaching from the rear.

Another object of the invention is to provide a glare shield supporting arm having swivel joints therein and a bar adapted to be mounted in the vehicle and from which the arm is suspended in which the bar is adapted to be mounted in the vehicle by the average layman.

A further object of the invention is to provide a glare shield supporting bracket that permits the glare shield to be adjusted to various positions in which the shield and bracket are of simple and economical construction.

With these and other objects and advantages in view the invention embodies an L-shaped bar having offset ends adapted to be attached to the inner surface of a motor vehicle and positioned above the windshield and one of the front doors and an arm having a plurality of swivel joints or connections therein slidably mounted on the bar and having a shield suspended by the lower end thereof.

Other features and advantages of the invention will appear from the following description taken in connection with the drawing, wherein:

Figure 1 is a perspective view showing a portion of the front of a motor vehicle with the top omitted illustrating positions of glare shield mountings of this invention with glare shields suspended by brackets having swivel connections therein from L-shaped bars positioned above the sides of the windshield and over front doors thereof.

Figure 2 is a perspective view illustrating the arm having the swivel connections therein, with the parts shown on an enlarged scale showing the arm mounted on a bar and also showing a glare shield secured in the lower end of the arm.

Figure 3 is a cross section taken on line 3—3 of Fig. 2 with the supporting bar shown in section and with the arm having a swivel connection therein shown in elevation.

Figure 4 is a plan view of the shield supporting bracket also showing the device mounted on a bar and showing a shield depending from the lower end of the arm.

Figure 5 is a vertical section taken on line 5—5 of Fig. 2 illustrating one of the swivel connections and showing the connection of the lower end of the arm to a glare shield.

Referring now to the drawing wherein like reference characters denote corresponding parts the improved glare shield mounting of this invention includes a shield 10, preferably of translucent material adapted to intercept glare rays without obstructing vision, an L-shaped bar having a transversely disposed section 11 and a longitudinally positioned section 12 mounted in the upper corner of a vehicle, a plate 13 having a flange 14 extended from one edge and slidably mounted on the bar by a U-shaped bracket 15, a clip angle 16 pivotally mounted on the flange 14 by a pin 17, a link 18 pivotally connected to the clip angle 16 by a pin 19, a strip 20 pivotally connected to the lower end of the link 18 by a pin 21 and having an offset clip 22 secured to the lower end by a bolt 23 and a bolt 24 extended through the clip and lower end for retaining the shield 10 in position in the lower end of the device.

The section 11 of the hanger or support bar is provided with a flange 25 by which the end of the bar may be attached to the frame of the vehicle by a screw or other fastening means and the end of the section 12 is provided with a similar flange 26 that is secured to the vehicle by a screw or other fastening means. One side of the bar including the sections 11 and 12 is provided with spaced grooves 27 into which a ridge 28 of a spring 29 on the bracket 15 is adapted to extend, ends 30 and 31 of the spring being extended around ends of the bracket, as shown in Fig. 4 and the spring being positioned between an outer or straight section 32 of the bracket and the surface of the bar. With the spring positioned in this manner the support is adapted to be moved along the bar by hand until the ridge or section 28 of the spring snaps into one of the grooves 27. The device is retained by the ridge in adjusted position on the bar and remains in a suitable position until the bracket is moved by an outside force. Flanges 33 and 34 of the bracket 15 are secured to upper and lower ends of the plate 13 with bolts 35 and 36, respectively.

One side of the plate 13 to which the bracket 15 is connected is provided with an arcuate lip 37 which extends from a notch 38 at the upper edge of the bar 11 to a similar notch at the lower edge of the bar and the flange 14 extends between similar notches 39 at the opposite side of the plate. By this means the edges of the plate extend outwardly to facilitate sliding on the sections 11 and 12 of the bar.

The swivel connections or joints between the parts are formed, as illustrated in Fig. 5, with projections or nodes 40 punched from the strip 20 and positioned in registering relation with indentations 41 in the link 18 whereby with the nodes and indentations equally spaced the parts are adapted to be turned to suitable angles and with the nodes positioned in the indentations the parts will remain in adjusted positions without being jarred from such positions, by vibrations resulting from the traveling motion of the vehicle.

Similar nodes of the flange 14 are positioned to coact with indentations 42 of the clip angle 16 and nodes of the opposite leg of the clip angle are positioned to coact with indentations 43 in the upper end of the link 18.

The nodes of the flange 14 coacting with the indentations 42 in one flange of the clip angle 16, and in combination with the bolt 17 permit the shield to swing to a horizontally disposed position when the shield is not in use. The nodes of the extended flange of the clip angle 16 coacting with the indentations 43 of the link 18 in combination with the bolt 19, and the nodes 40 of the strip 20 coacting with indentations 41 of the link 18 in combination with the bolt 21 permit the shield to swing to substantially any position over the windshield. The spring 29 in the bracket 15 permits the shield to be moved to substantially any position on the driver's side of the vehicle.

With the parts designed and assembled as illustrated and described a supporting device is provided that provides absolute protection against glare rays for the operator of a motor vehicle and the device may readily be adjusted to different positions by the operator as the vehicle is in operation. A similar device positioned on the opposite side of the vehicle provides the same protection for a passenger and may also protect the eyes of the operator from sun rays passing through the right hand corner of the vehicle.

The parts may be made of metal, plastic, or other suitable material.

Although the mounting bar including the sections 11 and 12 is shown as being rectangular-shaped in cross section it will be understood that the bar may be of any other suitable shape.

It will be understood that modifications, within the scope of the appended claims, may be made in the design and arrangement of the parts without departing from the spirit of the invention.

What is claimed is:

1. In a glare shield mounting, the combination which comprises an L-shaped bar for use in a motor vehicle with one section of the bar positioned over one side of a windshield of the vehicle and the other over a front door on the adjacent side of the vehicle, a plate positioned against one side of said mounting bar, a U-shaped bracket attached to the plate and through which the bar extends for slidably mounting the plate on the bar, said plate having a flange extended therefrom, a clip angle connected by a swivel joint to the flange of the plate, a link connected by a swivel joint to the clip angle, a strip having an offset clip on the lower end connected by a swivel joint to the link, and a glare shield mounted between the offset clip and the extended end of the strip.

2. In a glare shield mounting for use in a motor vehicle, the combination which comprises an L-shaped bar having a transversely disposed section adapted to be positioned above one side of a windshield of the vehicle and another section adapted to be positioned above a front door on the adjacent side of the vehicle, a plate having a flange extended from one edge positioned against one side of the bar, a bracket extended around the bar and attached to the plate for slidably mounting the plate on the bar, said bar having spaced grooves therein, a spring in the bracket positioned to coact with the grooves of the bar for retaining the plate in adjusted positions on the bar, a clip angle connected by a swivel joint to the flange of the plate, an arm having swivel joints at the ends connected to the clip angle and a shield carried by the extended end of the arm.

3. In a glare shield mounting for use in a motor vehicle, the combination which comprises an L-shaped bar having a transversely disposed section adapted to be positioned above one side of a windshield of the vehicle and another section adapted to be positioned above a front door on the adjacent side of the vehicle, a plate having a flange extended from one edge positioned against one side of the bar, a bracket extended around the bar and attached to the plate for slidably mounting the plate on the bar, said bar having spaced grooves therein, a spring in the bracket positioned to coact with the grooves of the bar for retaining the plate in adjusted positions on the bar, a clip angle mounted by a swivel connection on the flange of the plate, a link mounted by a swivel connection on the clip angle, a strip having a clip on the lower end mounted by a swivel connection on the link and a shield connected to the extended end of the strip with a bolt extended through the strip and clip, said swivel connections including nodes registering with indentations whereby sections of the arm are retained in adjusted positions.

References Cited in the file of this patent

UNITED STATES PATENTS

| | | |
|---|---|---|
| 1,013,943 | Kuenholdt | Jan. 9, 1912 |
| 1,468,750 | Sechrist | Sept. 25, 1923 |
| 1,840,332 | Riches | Jan. 12, 1932 |
| 1,853,943 | Tate | Apr. 12, 1932 |
| 1,888,703 | Summerbell | Nov. 22, 1932 |
| 1,932,475 | Peteler | Oct. 31, 1933 |

FOREIGN PATENTS

| | | |
|---|---|---|
| 10,611/32 | Australia | Dec. 19, 1932 |